United States Patent

Crawford et al.

[11] 3,946,917
[45] Mar. 30, 1976

[54] CAR-TOP BOAT CARRIER

[76] Inventors: Dennis M. Crawford, 19256 Partello Road; Murray G. Crawford, 728 Wright Lane, both of Marshall, Mich. 49068

[22] Filed: May 4, 1973

[21] Appl. No.: 357,455

[52] U.S. Cl............ 224/42.1 R; 206/523; 248/350
[51] Int. Cl.² .................. B60R 9/00; A47B 91/00
[58] Field of Search ...... 224/42.1 R, 42.42 R, 29 R; 206/523; 248/350; 105/486

[56] References Cited
UNITED STATES PATENTS

| | | | |
|---|---|---|---|
| 3,046,034 | 7/1962 | Herrick | 224/42.1 R |
| 3,153,294 | 10/1964 | Hay et al. | 224/42.1 R |
| 3,334,798 | 8/1967 | Pezely, Jr. et al. | 206/523 X |
| 3,531,040 | 9/1970 | Myny | 206/523 |
| 3,542,282 | 11/1970 | Troth | 206/523 |

FOREIGN PATENTS OR APPLICATIONS

| | | | |
|---|---|---|---|
| 177,071 | 12/1953 | Austria | 224/42.1 B |

OTHER PUBLICATIONS

Outdoor Times: Jan. 12, 1973; p. 7 – "Boat-Tote" Car Top Carrier.

*Primary Examiner*—Robert J. Spar
*Assistant Examiner*—R. B. Johnson
*Attorney, Agent, or Firm*—Samuel Kurlandsky

[57] ABSTRACT

A car-top boat and canoe carrier comprising a pair of carrier members each comprising an elongate block of a foamed plastic material having a longitudinal groove provided therein for receiving in snap-on engagement the gunnels of a boat such as a canoe or car-top rowboat. Additionally, lateral or transverse slots are provided for receiving the thwart of a canoe or the oarlocks of a rowboat. After the carrier members have been snapped onto the boat, the boat is inverted, placed on the roof of a car, and the ends of the canoe or boat fastened to the bumpers with tie lines.

9 Claims, 12 Drawing Figures

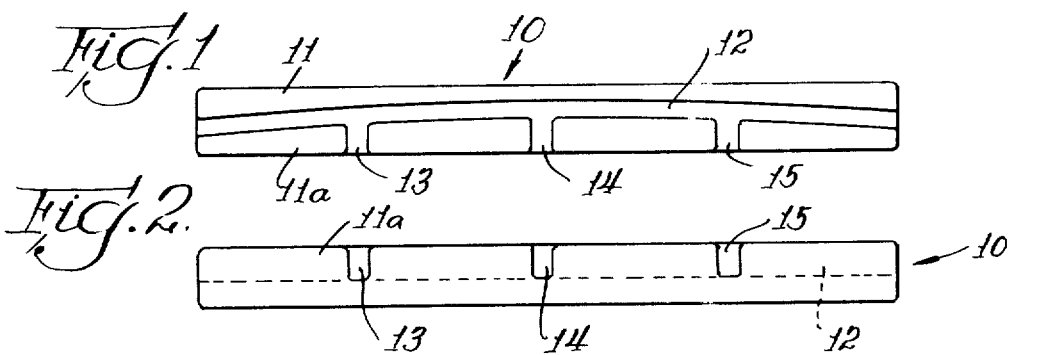
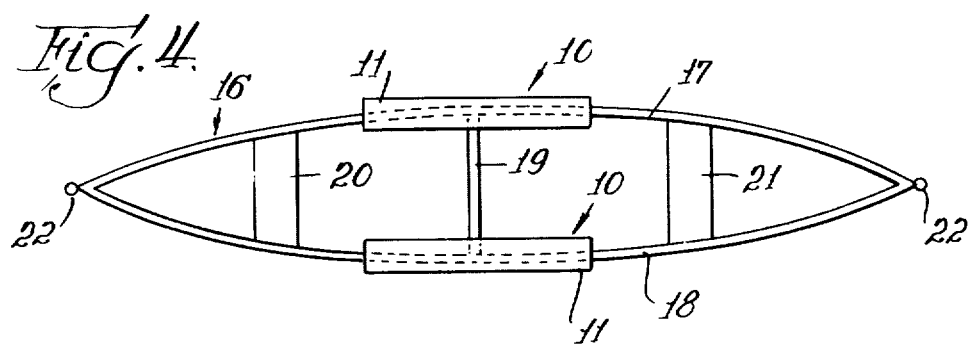
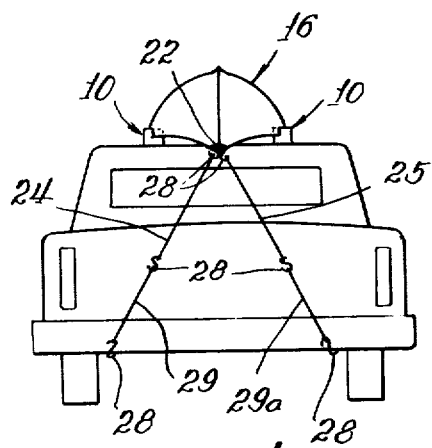
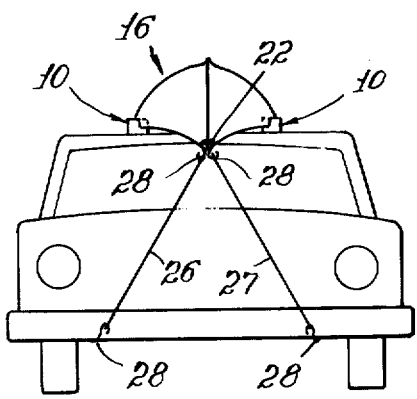

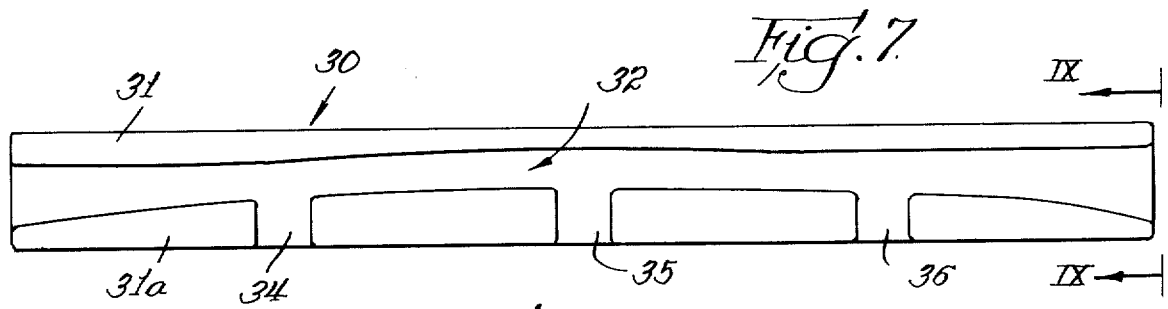
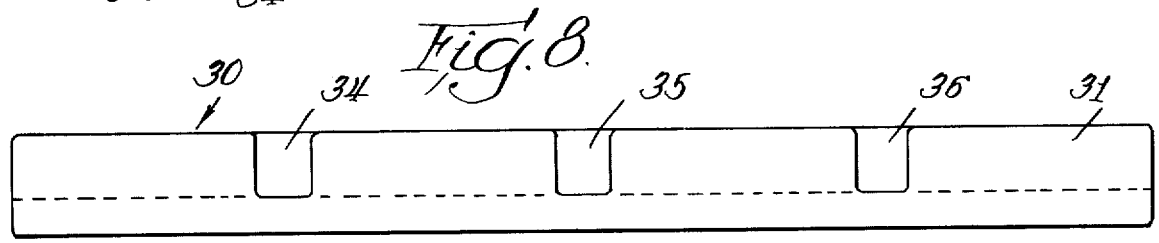
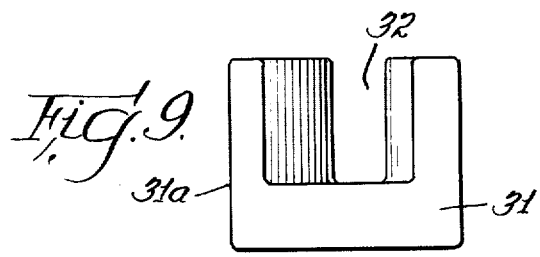
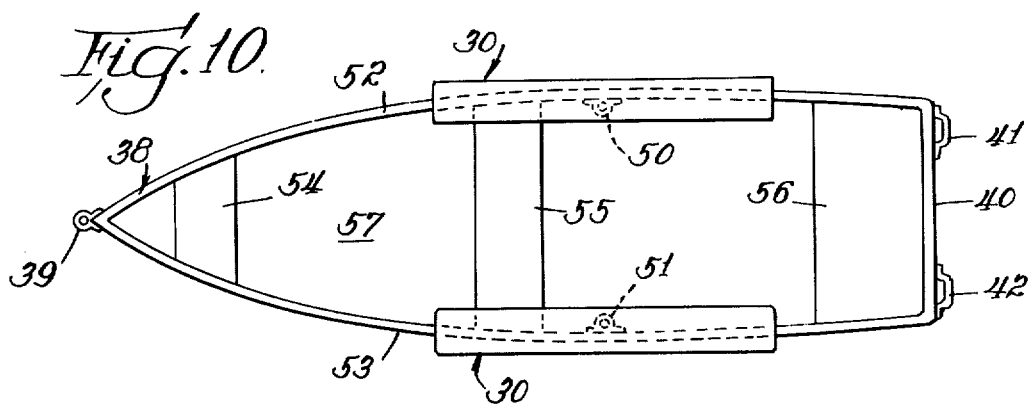
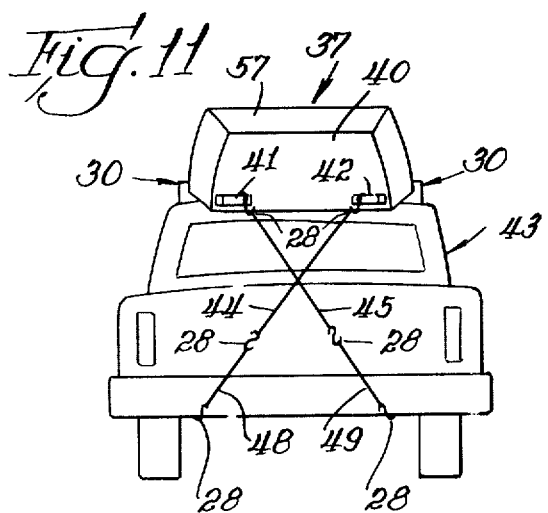
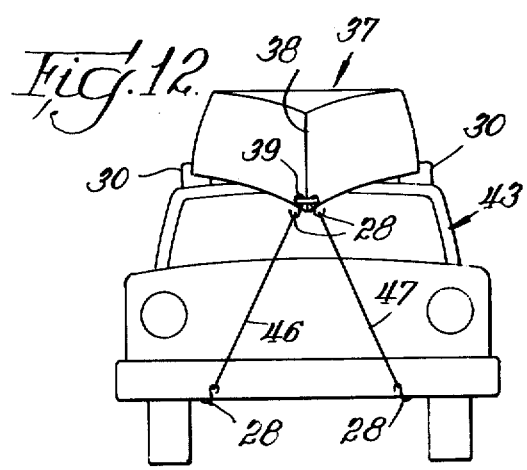

CAR-TOP BOAT CARRIER

BACKGROUND OF THE INVENTION

The present invention relates to car-top carriers for boats such as canoes and car-top rowboats, and more particularly refers to a lightweight carrier which may be mounted onto the gunnels of a boat or canoe and which supports and retains the boat or canoe by means of tie lines on the car top during travel.

Prior Art

Many sportsmen such as fishermen and hunters utilize boats in the pursuit of their sport. Since lightweight boats or canoes often are satisfactory for use in engaging in such sports, the boats are mounted on top of the cars utilized for transportation, since it is simpler and less expensive to transport a small boat on a car top than to pull the boat on a trailer. Car-top carriers for boats have been disclosed in the art. However, such carriers are quite expensive to fabricate and in some cases difficult to mount.

SUMMARY OF THE INVENTION

It is an object of the present invention to provide a car-top carrier for a boat such as a car-top rowboat or canoe.

It is a further object to provide a car-top carrier which is light and easily mountable.

It is still further an object to provide a car-top carrier which is inexpensive to produce and which provides reliable service over extended periods of time.

It is still an additional object to provide a car-top carrier which does not mar the finish of the car roof.

It is another object to provide a car-top carrier which snaps onto the gunnels of the boat before mounting, and remains in place as the boat is lifted and placed on the car top.

Still other objects will suggest themselves to one skilled in the art upon reference to the following specification, drawings, and claims.

According to the invention, a car-top boat carrier is provided comprising a pair of boat carrier members, each having a longitudinal groove, preferably arcuate, to permit the members to be snapped onto the gunnels of a boat such as a rowboat or canoe. Lines are provided to tie each end of the boat to the car bumpers. The carrier members are preferably formed from a plastic foamed material such as foamed polystyrene. The carrier members are readily molded, are lightweight, provide suitable support for the boat, and are sufficiently non-abrasive so that they do not mar the finish of the car top and yet provide sufficient friction to maintain the boat in position.

BRIEF DESCRIPTION OF THE DRAWINGS

In the drawings,

FIG. 1 is a top view of a boat carrier member showing an arcuate channel particularly designed for carrying canoes.

FIG. 2 is a side elevational view of the boat carrier shown in FIG. 1.

FIG. 3 is an end view of the support member taken at the lines III—III of FIG. 1, looking in the direction of the arrows.

FIG. 4 is a top view of a canoe having a pair of support members mounted on the gunnels thereof.

FIG. 5 is a rear end view showing the canoe of FIG. 4 mounted on top of a car.

FIG. 6 is a front end view of the canoe and car shown in FIG. 5.

FIG. 7 is a top view showing a car-top carrier member particularly designed for supporting rowboats.

FIG. 8 is a side elevational view of the carrier member shown in FIG. 7.

FIG. 9 is a end view taken at the line IX—IX of FIG. 7, looking in the direction of the arrows.

FIG. 10 is a top view of a rowboat having a pair of boat carrier members mounted on the gunnels thereof.

FIG. 11 is a rear end view of a car having a rowboat mounted thereon by the carrier members of the invention, and FIG. 12 is a front end view of the car and rowboat of FIG. 11.

DESCRIPTION OF THE PREFERRED EMBODIMENTS

Referring to FIGS. 1–3, a boat carrier member 10 is shown comprising an elongate body 11 of generally rectangular form. The carrier member 10 is preferably formed of a molded plastic foam material such as polystyrene foam. Alternatively, foams of such material as phenolformaldehyde, polyvinyl chloride, polystyrene, polyurethane, etc., may be utilized. A substantially rigid foam is preferred, although elastomeric foams may be utilized for lighter weight boats. The plastic foam body 11 is provided with an arcuate vertically oriented channel or groove 12 adapted to receive the gunnel of a boat or canoe. The carrier member shown in FIGS. 1–3 is particularly adapted to be utilized for supporting canoes. The curvature of the arcuate channel is so designed that it receives the boat gunnel, but is of such thickness and such curvature that in order to receive the boat gunnel within the channel, the carrier member must undergo a small amount of distortion. As a result of this arrangement, the gunnel snaps into the channel and the carrier member remains engaged over the gunnel even when the boat or canoe is inverted. A plurality of transverse channels 13, 14, and 15 are provided communicating with the arcuate channel 12 and with a side wall 11a of the body 11. The transverse grooves are provided to receive the thwart 19 of a canoe (FIG. 4). Although a single transverse groove, as for example channel 14 is sufficient for most purposes, additional channels 13 and 15 may be provided to render the carrier member 10 more versatile, and to permit the boat or canoe to be placed in different positions, dependent upon its length.

Referring to FIG. 4 a canoe 16 is shown having gunnels 17 and 18, a thwart 19 and seats 20 and 21. Rings or eyes 22 are provided for towing the canoe and for affixing tie-down lines. In FIG. 4 the carrier members 10 have been mounted one on each gunnel of the canoe, with the gunnels being sufficiently grasped by the sides of the arcuate channel 12 so that the carrier members remain affixed to the gunnels even when the canoe is inverted.

Referring to FIGS. 5 and 6, the canoe 16 is shown mounted on a car 23, supported by carrier members 10 engaging the gunnels 17 and 18 of the canoe. As shown in the drawings, the canoe is fastened to the bumper of the automobile in the rear by means of lines 24 and 25 engaged by the ring 22 at one end, and by lines 26 and 27 in the front attached to the ring 22 at the other end and to the front bumper.

In preparing the canoe for mounting on a car top, the two carrier members are snapped on, one on each gunnel, with the middle slot 14 used to receive the thwart. The forward slot 15 or rear slot 13 may be used to change the position of the carrier members and canoe on the vehicle, dependent on the size of the canoe. The canoe is then turned upside down and set down upon the roof or top of the vehicle. The four pieces of line, as for example ⅜ inch nylon rope 24, 25, 26, and 27, are utilized as tie-downs. The front tie-down system shown in FIG. 6 consists of two lengths of line which may be provided with S-hooks 28 on each end of each line. Two S-hooks with attached ropes are hooked to the eye or ring 22 of the canoe. This attachment should be made both at one point. The other end of each rope is hooked by means of S-hooks, or otherwise tied, under the front bumper at the lower right and lower left side. When affixed, each line arrangement resembles an inverted-V and provides both forward and side movement stability. The canoe is then pushed to the rear of the vehicle until one end of each support member is raised approximately two inches. The rear tie-down assembly is then applied comprising the two nylon rope lines 24 and 25, two 9-inch rubber tension straps 29 and 29a, and six S-hooks 28. The nylon lines are cut nine inches shorter and the 9-inch rubber tension straps 29 and 29a connected to the ends thereof by S-hooks and attached at the other end to the bumper by S-hooks 28. When attached, the tension strap should be in a slightly stretched condition. This permits both front and rear tie-downs to be tight while the tension straps allow for the shock of travel.

Referring to FIGS. 7–9, a boat carrier member 30 is shown particularly adapted for carrying rowboats. The carrier member 30 is formed of a plastic foam block body 31 similar to that shown in FIGS. 1–3. The carrier member 30 is provided with a longitudinal channel 32 designed to receive the gunnel of a rowboat and to snap on thereto and to remain affixed to the gunnel. As seen in FIG. 7, one side of the arcuate channel 32 has a smaller curvature than that at the other side. This is designed to accommodate the decreased curvature of a rowboat. If desired, both sides may have a decreased curvature. The carrier member shown in FIG. 7–9 may be molded in the same mold as that shown in FIGS. 1–3. However, in order to provide the change in contour of one side the arcuate groove 32, modified inserts may be provided in the mold. The carrier member 30 is additionally provided with transverse channels 34, 35, and 36 connecting the arcuate channel 32 with the inner face 31a of the carrier member. The transverse channels are provided to clear the oarlocks 51 and 52 and other structures which may be present in the gunnels of the rowboat. If desired, only a single transverse channel may be utilized, although the presence of more than one provides greater versatility in the positioning of the rowboat and carrier members on the car top and accommodates boats of various sizes.

Referring to FIG. 10, a rowboat 37 is shown having a bow 38 having an eye or ring 39, a stern 40, and gunnels 52 and 53. Oarlocks 50 and 51 are mounted on the gunnels 52 and 53, respectively. The boat is additionally provided with seats 54, 55, and 56 and a bottom 57. Handles or hooks 41 and 42 are mounted on the stern 40.

In mounting, the boat is inverted and placed on the top of the car 43 as shown in FIGS. 11 and 12. The front end of the rowboat is tied down in the manner similar to that discussed in regard to the canoe, by means of two nylon rope lines 46 and 47 with S-hooks provided on each end of each line. The S-hooks at one end are engaged to a ring or eye 39. The other ends of the line are hooked by means of S-hooks to the bumper. The square end of the boat is tied down as follows. One tie-down line 44 is hooked by means of an S-hook to a handle or hook 42 at the left corner of the boat. The other tie-down line 45 is hooked by means of an S-hook to a handle or hook 41 at the right side of the boat. Nine-inch elastic tension straps 48 and 49 are connected to the lines 44 and 45, respectively, by means of S-hooks. S-hooks provided at the other end of the tension straps 48 and 49 are hooked to the bumper. When completely tied, the tie-lines are in the form of an "X", eliminating side motion during travel. If the bow of the boat is also square, crossed tie-lines may be utilized in the same manner, but it is not necessary to utilize tension straps at the front end.

The boat support members of the present invention and the tie-line assembly for anchoring the boat to the car have a number of advantages over prior art structures. First, the support members may be very easily and inexpensively molded from lightweight inexpensive plastic foam materials. Second, the support members are resilient to absorb shocks. There is sufficient friction at the bottom of the support members to prevent sliding of the boat during travel, and yet the material is sufficiently soft so that the car top paint is not scratched. The structure may be readily varied by means of inserts provided in the mold to change from canoe-accommodating support members to rowboat-accommodating support members. Transverse channels are provided to clear structures on the boat or canoe such as oarlocks or thwarts. The inverted V or X-type of tie-line arrangement together with hooks and elastic tension straps secure the boat firmly in place and yet provide for a small amount of movement due to vibration and jostling to be absorbed. The support members together with the tie-lines may be readily stored in small spaces.

It is to be understood that the invention is not to be limited to the exact structures or procedures shown and described, as obvious modifications and equivalents will be apparent to one skilled in the art.

We claim:

1. A car-top carrier for supporting and transporting a boat on the top of a car the improvement comprising: a pair of rigid plastic foam elongated carrier members each having a longitudinal arcuate channel provided therein adapted to receive a gunnel of said boat and to support said boat in an inverted position when mounted one on each side on said car top, a plurality of transverse channels in each of said members, said transverse channels communicating with said longitudinal arcuate channel and providing clearance for structures of said boat mounted to said gunnel, said longitudinal arcuate channel being so contoured as to cause distortion of said carrier members when mounted on the gunnel of said boat, thereby causing said carrier members to be clamped to said gunnel and means for fastening the ends of said boat to said car on which said boat and said carrier members are mounted.

2. A car-top carrier according to claim 1, wherein said plastic foam is polystyrene.

3. A car-top carrier according to claim 1, wherein both side walls defining said longitudinal channel have a relatively high curvature to accept the gunnel of a canoe.

4. A car-top carrier according to claim 1, wherein at least one side wall of said longitudinal channel is provided with a relatively low curvature to accept the gunnel of a small rowboat.

5. A car-top carrier according to claim 1, having two pairs of lines, one pair provided for tying each end of the boat to the bumpers of said car.

6. A car-top carrier according to claim 5, wherein each line of one pair of lines is provided with a resilient tension strap at the end thereof.

7. A car-top carrier according to claim 5, wherein said lines are hooked to said boat and to a bumper of said car by means of S-hooks.

8. A car-top carrier according to claim 6, wherein said lines are hooked to said tension straps by means of S-hooks.

9. A car-top carrier according to claim 1, wherein at least one sidewall of said longitudinal channel is provided with a relatively high curvature.

* * * * *